Aug. 28, 1945.   E. D. COLEMAN   2,383,450
ELECTRODE STRUCTURE FOR pH MEASUREMENT AND CONTROL DEVICE
Original Filed Jan. 25, 1939   3 Sheets-Sheet 1
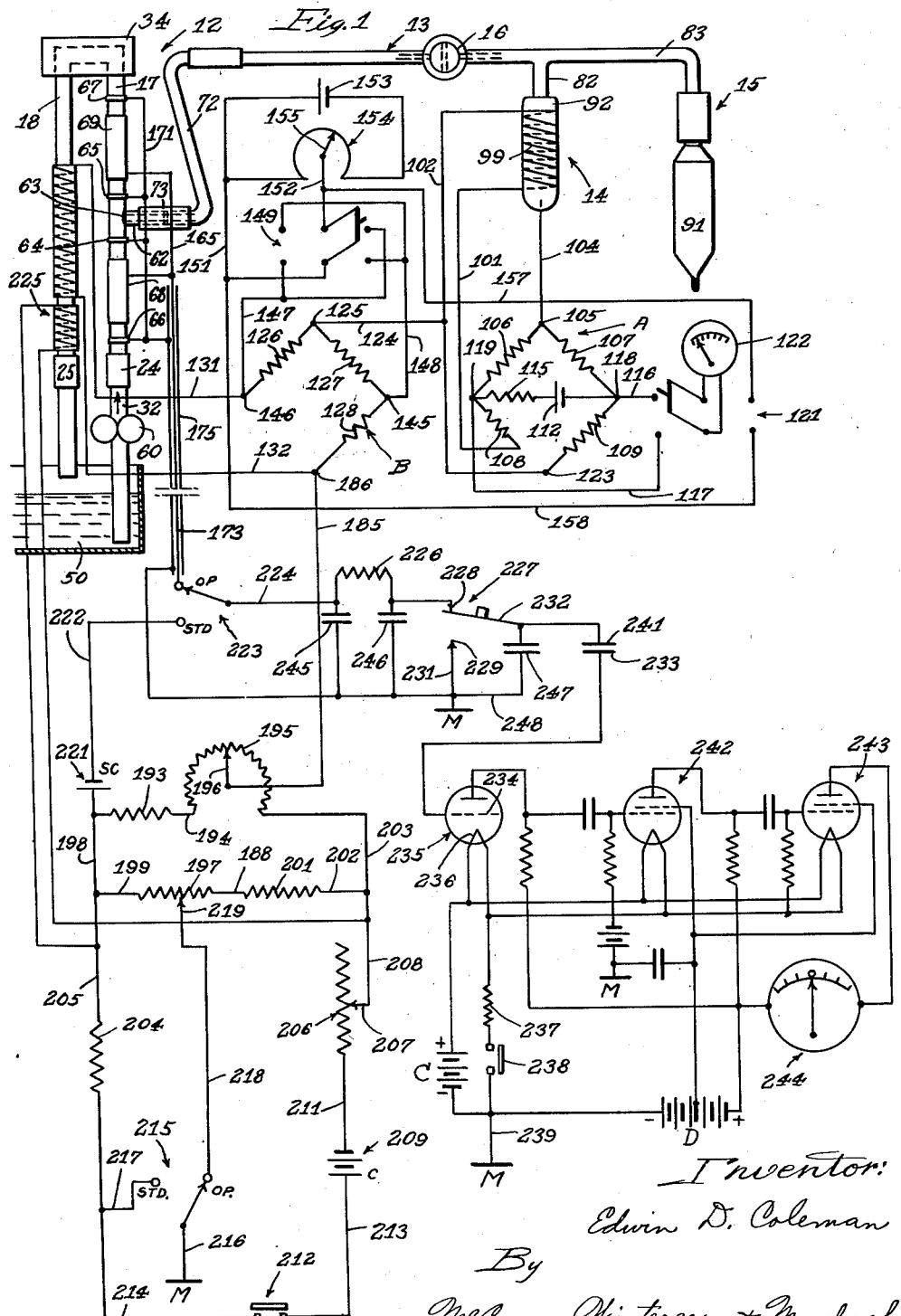
Inventor:
Edwin D. Coleman
By
McCanna, Wintercorn + Morebach
Attys.

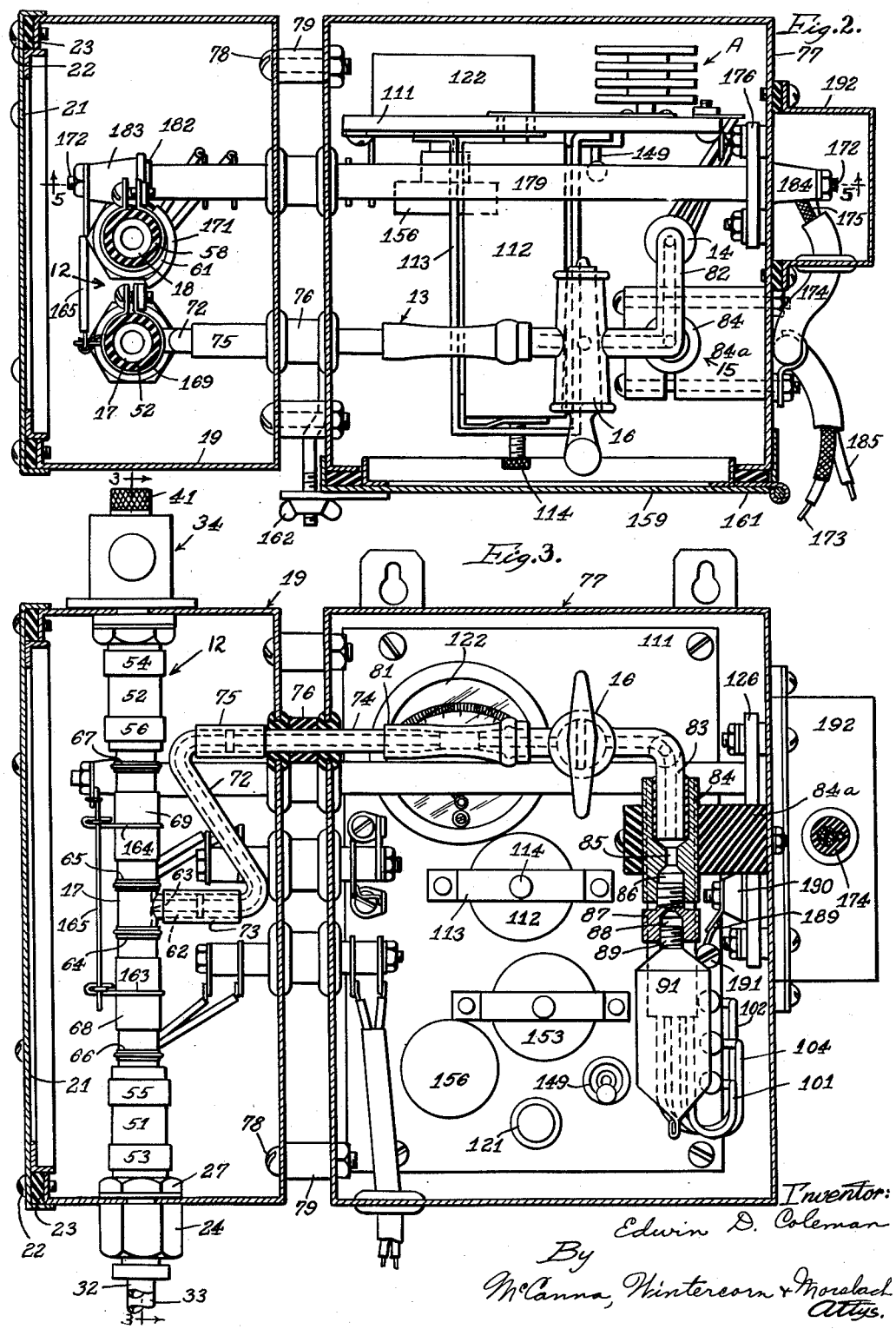

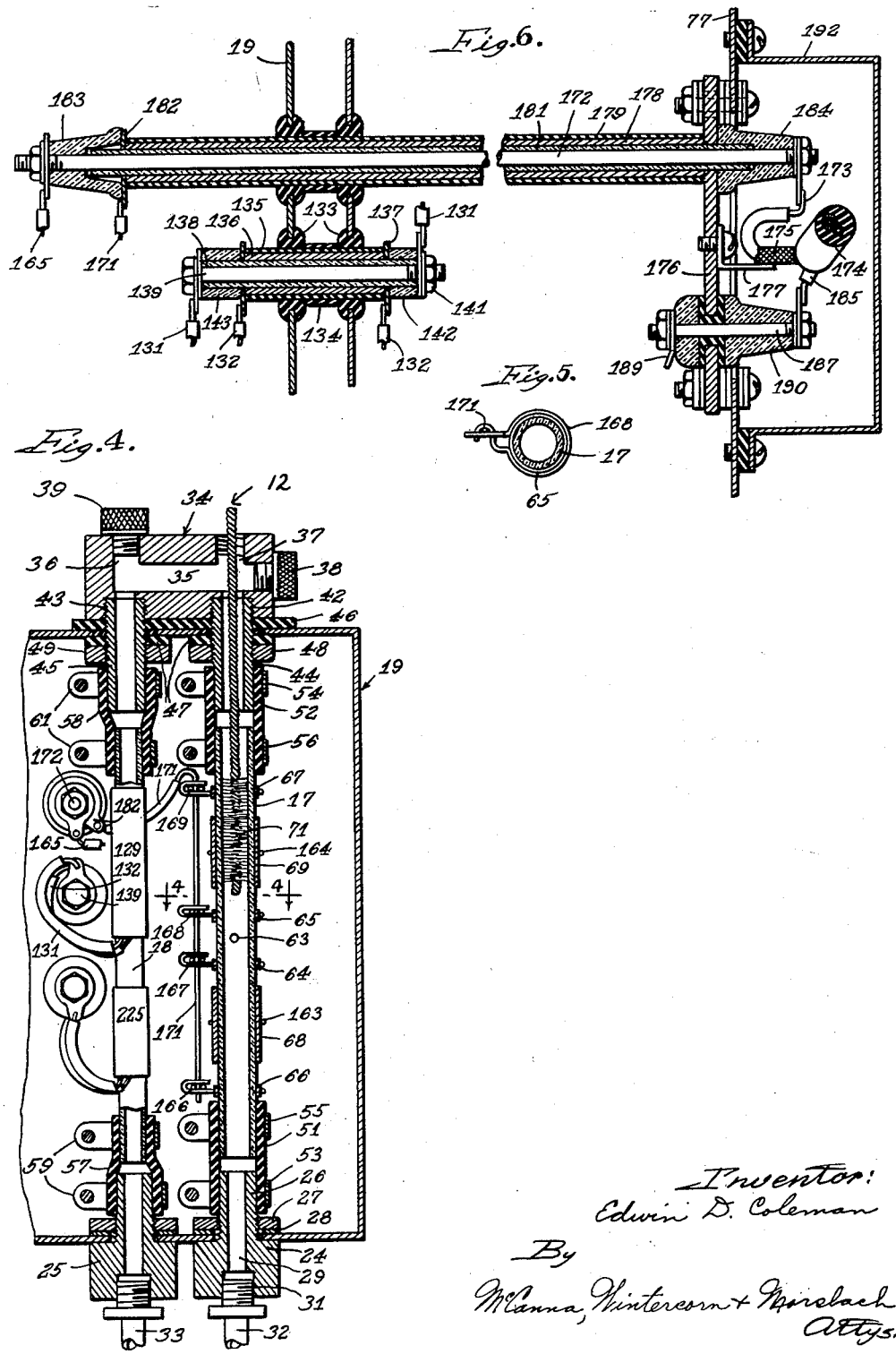

Patented Aug. 28, 1945

2,383,450

UNITED STATES PATENT OFFICE 2,383,450

ELECTRODE STRUCTURE FOR pH MEASUREMENT AND CONTROL DEVICES

Edwin D. Coleman, Maywood, Ill.

Original application January 25, 1939, Serial No. 252,779. Divided and this application February 8, 1940, Serial No. 317,805

11 Claims. (Cl. 175—183)

This invention relates to ion activity measurement and control devices, such, for example, as a hydrogen ion measurement device and parts thereof.

This is a division of my application entitled "pH Measurement and control device and bridge material therefor," filed January 25, 1939, which matured into Patent No. 2,311,976.

An object of the invention is the provision of a generally improved device for electrically measuring ion activity which is reliable both for scientific and control purposes and has greater ruggedness, accuracy, and simplicity in operation than similar devices heretofore known, and the combination therewith of improved recording and control means.

Another object of the invention is the provision of an ion activity measuring device having improved test electrode construction.

An object of the invention is also to provide an ion activity measuring device having improved cell chain construction.

A further object is the provision of an ion activity measuring device having improved means for bringing the test electrode and the solution into operative relationship.

Another object of the invention is the provision of an ion activity measuring device having electrodes capable of being easily and readily cleaned at the active surface thereof.

I have also aimed to provide an ion activity measuring device having improved means for eliminating the effects of stray currents between the electrode supports which may interfere with the accuracy of the device.

A further object is the provision of an ion activity measuring device having improved means for supporting the test electrode.

Another aim of the invention is the provision of an electric ion activity measurement device having improved means for producing and for renewing the liquid junction thereof.

A still further object of the invention is the provision of an electric ion activity measuring device having improved relationship between the bridge material and the reference electrode.

Another aim of the invention is the provision of improved means for connecting the cell chain to an electronic amplifier.

Another object of the invention is the provision of an ion activity test device wherein improved temperature compensation means is employed for automatically compensating for variations in the temperature of the test solution and electrodes of the cell chain.

A further object of the invention is the provision of an ion activity measurement device having an arrangement to accommodate improved bridge material.

A still further object of the invention is the provision of a bridge material of improved composition, such as to produce improved operating characteristics in a cell chain embodying the same and arranged to facilitate the renewal of the liquid junction either by manual or by automatic means during the operation of a testing device.

A further object is the provision of improved means for feeding the output of the cell chain to the galvanometer or other measurement device.

Other objects and advantages will appear from the following description and the accompanying drawings, in which—

Figure 1 is a wiring diagram of a pH measurement device showing one embodiment of my invention;

Fig. 2 is a horizontal section through the cabinets housing the electrodes and a part of the temperature compensation mechanism;

Fig. 3 is a vertical section through said cabinets;

Fig. 4 is a section on the line 3—3 of Fig. 3;

Fig. 5 is a section on the line 4—4 of Fig. 4;

Fig. 6 is a section on the line 5—5 of Fig. 2;

I have herein shown and described the invention as embodied in a device for the testing of solutions for pH, but it will be understood that many of the features thereof are not limited to the measurement of this particular property but may be applicable to the measurement and handling of other potentials of small magnitude and for analogous purposes.

Referring first to Figures 1, 2 and 3, the cell chain includes a test electrode assembly designated generally by the numeral 12, a salt bridge 13, a reference electrode 14, and means for maintaining the salt bridge and renewing the liquid junction including the element 15 and the stop cock 16. The salt bridge and associated structure is separately shown and claimed in my copending application Serial No. 493,559, filed July 3, 1943. The structure of the glass electrode assembly includes a glass electrode tube 17 and a temperature compensation tube 18 (Figs. 2 and 4). It will be understood by those skilled in the art that a metal electrode of suitable metal such as gold, platinum or antimony may be substituted for the glass electrode tube, in which instance the advantages of the mounting and sampling construction would still obtain, the chain then being sensitive to ion species determined by the nature of the sample and of the metal inner surface of the electrode, and where in the claims I use the term glass or test electrode, I also mean such equivalent where applicable. The glass electrode tube 17 and temperature compensation tube 18 are carried within a metal box designated generally by the numeral 19 having a cover 21 secured across one face thereof by means of screws 22 which compress the cover against a rubber or similar seal 23 for the purpose of sealing the interior of the box against the passage of air therethrough for a purpose presently to be described. Secured in the bottom wall of the box 19 are fittings 24 and 25, these fittings each having a hexagonal lower end and a cylindrical upper end 26 passing through openings in the box, the hexagonal lower end abutting against the outer surface of the box so as to prevent passage of air therethrough. The cylindrical upper end 26 is threaded for the reception of a nut 27 for fixing the fitting in place, a lock washer 28 being interposed between the nut and the inner wall of the box, the whole forming a practically air-tight connection and providing electrical connection between the fittings and the box. The fittings have internal bores 29 and internally threaded counterbores 31 for the passage of liquid through the fitting and for the reception of inlet and outlet pipes 32 and 33. A further fitting designated generally by the numeral 34, which may be either of metal or of insulation material such as synthetic resin, is positioned against the top wall of the box 19 and has a longitudinal bore 35 extending from one end thereof to intersect a transverse bore 36. A second transverse bore 37 is provided adjacent the open end of the bore 35, and the open ends of the bores 35, 36 and 37 are normally closed by screw plugs 38, 39 and 41 threaded into the bores. The transverse bores 37 and 36 also have threaded counterbores 42 and 43 for the reception of nipples 44 and 45 which project through the top wall of the box 19 (note Fig. 4), insulation 46 and 47 being positioned against opposite sides of the box when the fitting is of metal for the purpose of electrically insulating the fitting and the nipples from the box. The nuts 48 and 49 are threaded onto the nipples and serve to secure the fitting rigidly in position on the box. The electrode tube 17 is supported within the box between the nipple 44 and the portion 26 of the fitting 24, the ends of the tube being in spaced relation to these elements and being secured thereon by flexible rubber sleeves 51 and 52. Metal bands 53 and 54 clamp the rubber sleeves to the fittings, and clamps 55 and 56 likewise clamp the rubber sleeves to the ends of the electrode tube to provide fluid-tight connections of sufficient flexibility so that the electrode tube cannot be strained or will not be broken by sudden shocks either thermal or mechanical. The temperature tube 18 is likewise connected to the nipple 45 and the fitting 25 by means of rubber sleeves 58 and 57 and clamps 61 and 59.

Intermediate the ends of the electrode tube 17 and preferably at the mid-point therebetween is a junction tube 62 joining with the electrode tube through which the salt bridge material is passed to establish the usual liquid junction with the contents of the electrode tube, this junction being formed at the point indicated by the numeral 63. Equally spaced from the point 63 are guard rings 64 and 65 on opposite sides of the point 63 and guard rings 66 and 67 equally spaced from the guard rings 64 and 65. Interposed between the guard rings 64 and 66 and the guard rings 65 and 67 and equally spaced therefrom are contact layers 68 and 69. I have found that intimate contact between the surface of the glass tube and the metal coating forming the guard rings and contact layers is imperative for consistently good results. This contact may be secured, for example, by thermally dispersing a metal such as silver over the glass surface preferably by spraying thereon. The characteristics of the metal are, however, exceedingly important if any material thickness is applied, since the film apparently puts the glass in a condition of stress. I have found that minimum asymmetry potentials are developed and superior stability occurs if lead is applied and is applied by the spray method. I have also used tin, brass, steel, zinc, and other metals, and have found that the performance appears to improve as the metal becomes softer. I have also employed silver and gold, applied chemically, both of which worked well but were difficult to apply. Woods metal may also be employed where the temperatures of the solution are sufficiently low.

The solution under test is circulated through the interior of the electrode tube 17, as for example, from a tank 50 by means of a pump 60, the solution passing through the fitting 24, the electrode tube 17, the nipple 44, the fitting 34, the nipple 45, the temperature compensation tube 18, the fitting 25, and thence back to the tank or to some other point of disposal as circumstances may require. The fittings 24 and 25 are in good electrical contact with the metal box 19 so that these fittings are always at substantially the same potential and represent the only points at which the system is in electrical contact with the box, since the fitting 34 and the nipples 44 and 45 are carefully insulated from the box. Accordingly, if there is a difference in potential between the fluid lines delivering sample to fitting 24 or receiving sample from the fitting 25, this difference in potential is largely dissipated by current flow between the fittings 24 and 25 through box 19, and there is a minimum of current flowing through the solution in the electrode tube, the fitting 34 or the temperature tube 18. I have found this to be important as a means of eliminating serious errors. Furthermore, I have found that by insulating fitting 34 from the box 19 any difference in potential between the solution within the fitting 24 and within the fitting 25 exerts much less error than would occur if fitting 34 were in electrical contact with the box 19. It appears that no two fittings can be made having exactly the same potential with respect to the solution, and consequently there will always occur some flow of current traversing the column of fluid within the electrode tube. When, however, the fitting 34 is insulated, the two electrodes constituting the cell which generates this current will be fittings 24 and 25 and the electrolyte path becomes very long. Further, I have found it desirable though not essential that temperature tube 18 be made of somewhat smaller diameter than the electrode tube 17 so that most of the IR drop will occur within the liquid in temperature tube 18 rather than within the liquid inside the electrode tube. It will be clear that the resistance of the fluid column within the temperature tube may be increased to any desired degree either by increasing the length or decreasing the bore of said temperature tube, and that the effect of the galvanic current in the electrode tube may thus be reduced to a satisfactory minimum. Further, it will be clear that the temperature tube not only may act as a support for the temperature compensating resistance coils but also may fulfill the even more important role of limiting said galvanic currents. I use the descriptive term "temperature compensation tube" independent of whether the tube fulfills either or both of said functions. The difference in potential between the fittings 24 and 25 and the solutions contacting the same can be largely eliminated if these fittings are made from pieces of metal immediately adjacent each other in the same bar, and can be further reduced by using approximately the same cutting action in boring the two pieces and in facing the inner surfaces of the same which are exposed to the fluid. Thus by using care and skill in the design and construction of the fittings 24 and 25, the error from this source can be almost completely eliminated.

In order to further reduce the effects of this transverse current through the electrode tube, I have found it desirable to make liquid junction with the liquid in electrode tube 17 at the point 63 and to symmetrically space the contact layers 68 and 69 with respect to the liquid junction at 63 whereby the effect of the transverse current on one of these contact layers is substantially compensated by the effect of the current on the other thereof. In other words, if the drop in potential between the liquid junction 63 and the electrode layer 68 is positive, the drop between the liquid junction 63 and the electrode layer 69 will be negative and very nearly of the same magnitude. The result is almost perfect compensation so that when this construction is coupled with symmetrical members 24 and 25 and with the use of a restricted bore in the temperature tube 18, the effect of the unavoidable galvanic currents generated between the fittings 24 and 25 and the contacting liquids becomes practically negligible so far as the operation of the device as a pH or analogous measuring instrument is concerned.

The plugs 38, 39 and 41 permit of access to the bore of the electrode tube and the temperature tube and to the bore 35 and allows insertion of a cleaning brush designated generally by the numeral 71 so that the surfaces of these bores may be readily freed from any adherent deposits or clogging which might occur therein. This is desirable particularly with respect to the electrode tube, since it has been found that certain suspended materials tend to deposit and adhere to the active surface of the electrode tube and thus cause the response of the electrode to become sluggish. When such a condition arises in an automatic pH controller, the period of response in the instrument may be so far delayed that automatic control becomes almost impossible. Similar deposits within the temperature tube 18 likewise retard the temperature response and also render the instrument inaccurate. The brush 71 may be periodically inserted in the bores of the tubes for manual cleaning thereof, but I have also found that the cleaning brush may be left permanently in place and the rod therefrom brought out through the bore 17 through a suitable stuffing box (not shown). If desired, the cleaning brush may be driven with a reciprocating or rotary motion by means of a small electric motor so as to continuously clean the active surface of the electrode tube when handling stubbornly adhering deposits.

Liquid junction with the sample within electrode tube 17 is established at the point 63 by means of a column of conducting material, preferably a semi-plastic material such as agar gel, described more in detail in my copending application Ser. No. 493,559. In this instance, this column of conductive material includes the tube 62 connected to a tube 72 by means of a rubber sleeve 73 which is in turn connected to a tube 75 by means of a rubber sleeve 75, the tube 74 extending through a rubber grommet 76 positioned in the back wall of the box 19 and in the side wall of a metal housing 77, the metal housing 77 being attached to the box 19 by means of screws 78 and spacers 79. The tube 74 is connected to the stop cock 16 by means of a rubber sleeve 81 which is connected to the source of bridge material 15 and to the reference electrode 14 by means of tubes 82 and 83, this system of tubes forming the conductive column or salt bridge 13. The salt bridge tube 13 is substantially filled with the bridge material which constitutes an electrical conductor between the liquid junction at 63 and the reference electrode 14. The stop cock 16 is normally closed, but a layer of bridge material is inevitably produced about the bore of the stop cock in response to the turning of the cock, and maintains electrical communication through the cock. The free end of the tube 83 carries a fitting 84 supported in an insulating block 84a and having a bore 85 communicating with the interior of the tube 83, and a threaded counterbore 86 threaded to receive an adapter 87 which is also provided with a bore 88 adapted to receive the threaded dispensing end 89 of a conventional collapsible tube 91. The bridge material is carried in the tube 91 and is dispensed through the bore of the adapter 87 and the bore of the fitting 84 into the tube 83.

This is accomplished by opening the cock 16 and then compressing the tube 91, thereby forcing bridge material from the tube into the salt bridge tube 13, discharging an equivalent amount of the exhausted bridge material at the point 63 from whence the exhausted material is rejected from the electrode tube with the flow of sample therethrough. The cock 16 is closed during normal operation so that in the event of excessive fluid pressure in the electrode tube, this excessive pressure cannot be relieved by driving the bridge material back into the collapsible tube 91 or into the reference electrode 14.

In order to effect compensation for variation in temperature of the sample and for variation in temperature of the reference electrode, two temperature compensating circuits are employed, designated generally in Figs. 1 and 8 by the letters A and B. The reference electrode is surrounded with a resistance coil 99 (Fig. 1) having leads 101 and 102, the resistance coil 99 being temperature sensitive. A lead 104 connects to a terminal of the reference electrode and constitutes one terminal of the cell chain consisting of the reference electrode and the glass electrode. The lead 104 from the reference electrode is connected at the point 105 to a network comprising resistances 106, 107, 108 and 109 and the temperature sensitive coil 99, the former being mounted on a plate 111 within the housing 77 and constituting a Wheatstone bridge fed by a battery 112 likewise secured to the plate 111 by means of a bracket 113 having a thumb screw 114 for easy replacement thereof. A resistance 115 is interposed between one side of the battery and the bridge. Conductors 116 and 117 connect intermediate points 118 and 119 of the bridge to a double-pole, double-throw switch designated generally by the numeral 121 for determination of the potential input to the bridge by meter 122, the switch and meter being supported on the board 111. These resistances are so proportioned that the bridge is substantially in balance at a predetermined temperature such as 25° C., and as the temperature at the temperature responsive coil 99 varies from 25° C. there is developed between the point 105 and the opposite side 123 of the bridge, a difference in potential substantially equivalent to the increment in potential occurring in the cell chain by virtue of the temperature change of the reference electrode. In this particular instance the condition is met when resistances 106, 107 and 109 are wound from manganin wire and are 500 ohms each while resistance 108 is 400 ohms of the same wire and temperature responsive resistance 99 consists of a nickel coil having a temperature coefficient of substantially 0.005 and a resistance of substantially 100 ohms at 25° C.

The Wheatstone bridge circuit A is therefore in series with the reference electrode. Connected to the lead 102 and thence to the point 123 of this bridge circuit is a conductor 124 connected at point 125 to the second Wheatstone bridge circuit B comprising resistances 126, 127, 128 and 129, the resistance 129 being wound on the temperature tube 18 and being in this particular instance of nickel wire of approximately 0.005 temperature coefficient and having a resistance of 500 ohms at approximately the temperature at which the sample will normally be. The other resistances are temperature insensitive coils, in this instance of 500 ohms each. Means are provided as heretofore described for the ready removal of the temperature tube 18 so that a suitable value for the resistance 129 may be selected for the particular temperature at which the instrument is intended to operate and so that the resistances may be readily interchangeable. Conductors 131 and 132 connect the temperature responsive coil 129 to the remainder of the bridge and include a connector member for conducting the current from the housing 77 to the box 19. This includes rubber grommets 133, a spacer 134 of insulation material within which is provided a tube of insulation material 135 carrying a smaller tube 136 of metal contacting at its ends with plates 137 on the ends of the conductor 132. Within the metal sleeve 136 is an insulating tube 138 carrying a threaded rod 139 having nuts 141 for attachment of the ends of conductor 131, the conductors being separated by spacers 142 and 143.

The latter Wheatstone bridge circuit is fed at the points 145 and 146 through conductors 147 and 148 connected to a polarity reversing switch designated generally by the numeral 149, this switch being fed through conductors 151 and 152 from a battery 153 and a voltage divider 154 having a movable slider 155, actuated by a knob 156 carried on the panel 111. It will be seen that the position of the slider 155 will fix the potential applied to the bridge so that the degree of response of this network with respect to the temperature at the coil 129 is adjustable both as to magnitude and as to polarity. Conductors 157 and 158 connect the polarity switch 149 to the switch 121 in such manner as to measure on the volt meter 122, the potential being applied to the second bridge circuit, that is, the circuit designated B, whereby the reading of this meter becomes a measure of the temperature response of said bridge. The purpose of this bridge is to compensate for changes in the pH of the sample with change in temperature. By properly adjusting slider 155 it is also possible to adjust the circuit so it compensates not only for change in pH of the sample with temperature, but will also compensate for any theoretical change in a normal hydrogen electrode at solution temperature.

Referring now more particularly to Figs. 2 and 3, the batteries 112 and 153 are shown mounted on the panel board 111. The voltage divider knob is indicated at 156, and the polarity reversing switch at 149, the switch 121 is shown as a push button normally connected to conductors 157 and 158, but connecting the meter 122 to the conductors 116 and 117 when depressed, thereby permitting momentary checking of the potential delivered from the battery 112. While the potential of battery 112 may vary somewhat, it is permissible from a practical standpoint to allow some variation in the potential thereof without introducing serious errors in the measuring circuit, since the temperature correction to the reference electrode is small in any event, and by means of the button 121 the potential of the battery may be readily measured at any time and the battery replaced when necessary. In the released position, with the meter 122 connected to the conductors 157 and 158, the meter continuously indicates the degree of correction being applied by bridge B, and by means of the voltage divider 154 this correction can be periodically re-set as the battery 153 gradually fails.

Attention is now directed more particularly to the manner in which the above-described elements are assembled. It will be noted that the electrode tube 17 and the temperature tube 18, together with their directly associated parts, are assembled within the box 19. It will be realized that the sample being circulated through the electrode tube and temperature tube may be at temperatures substantially different from room temperature, and since the temperature of the sample may vary to a considerable extent, I have found it desirable to thermally isolate the reference electrode from the region in which the temperature of the sample may exert any material effect. This is accomplished by mounting the electrode tube and the temperature tube, which carries a resistance coil 129 as described in my said patent, within the box 19 and by providing the cover 21 and the gasket 23 to substantially hermetically seal the box. Furthermore, space is provided within the box for the reception of an open container of a desiccant such as fused calcium chloride, hydrous calcium sulphide, sulphuric acid, or other desiccant to substantially free the air within the chamber from moisture. This is of particular importance where cold solutions are being passed through the electrode tube since otherwise condensation of moisture occurs on the outside of the glass electrode that may seriously interfere with the operation of the instrument because of short circuits between the various parts thereof. Furthermore, the arrangement is such that all adjustments and the cleaning of the electrodes is possible without entering the box 19. The electrical conductors and the salt bridge are brought through the box through rubber grommets which serve to seal the openings thereabout and prevent infiltration of moisture. The housing 77 is provided with a door, as indicated at 159 (Fig. 2) provided with a gasket 161 and secured in place by a wing nut 162 which may be opened to allow immediate access to the interior thereof for making adjustments in the electrical circuit as heretofore indicated.

In order to conduct the current from the glass electrode tube to the measuring instrument, wire loops 163 and 164 extend around and in intimate contact with the contact layers 68 and 69 and are engaged by a conductor 165 (Fig. 3). Wire loops 166, 167, 168 and 169 shown in Fig. 4 likewise engage the guard rings 66, 64, 65, and 67 and are interconnected by a conductor 171 (Fig. 4). The conductor 165 is connected to a metal rod 172 which extends from the interior of the box 19 through the housing 77 as shown in Fig. 6, the opposite end thereof being connected to a lead 173 from which circuit is completed to the measuring instrument through a cable 174, the lead 173 having a shield 175, so designed that the potential of the shield 175 is at the same potential as the lead 173 when the potentiometer of the measuring circuit balances that of the cell. The shield 175 is connected to a conducting plate 176 through a terminal 177. Mounted to the plate 176 and in electrical contact therewith is a metallic tube 178 protected from contact with outside sources by an insulating sleeve 179 and insulated from the rod 172 by a glass tube 181. The metallic tube 178 makes contact with a metallic washer 182 within the box 19 to which is connected the conductor 171 to which the guard rings are in turn electrically connected, these elements forming part of the so-called McClure circuit described in my aforesaid patent. Ceramic insulators 183 and 184 are in contact only with the conductor 171 or with regions at the same potential as the conductor 173 and the shield 175, and therefore, no leakage can occur from the ceramic insulators due to surface leakage when the cell changes potential balance because there exists no difference of potential between the conductor 171 or the lead 173 and the adjacent portions of the McClure circuit including the elements 182 and 176. It is thus possible to connect the glass electrode to the measuring device through the shield 175 without in any way disturbing the potential of the glass electrode lead including the conductor 165, the rod 172 and the lead 173 by stray electrical leakage, and it is further possible to extend the cable 174 for distances of several hundred feet, since a cable of this construction cannot leak to the conductor 173 when used in the electrical circuits herein described.

The purpose of the guard rings 64 to 67, inclusive, is to prevent electrical leakage along the surface of the glass tube. These four guard rings are connected together and to the McClure circuit, and hence, since the potential of this circuit is the same as that of the contact layers 68 and 69 of the glass electrode at the point of balance, there can occur no leakage from the contact layers along the surface of the glass tube.

Connection from the measuring instrument is made to the reference electrode through a conductor 185 (Fig. 1) connected to the circuit of the Wheatstone bridge B as at 186, the preferred manner of making this connection being shown in Fig. 6, the conductor being preferably enclosed within the cable 174 and being connected to a rod 187 in a ceramic insulator 190 carried on and insulated from the plate 176. A conductor 189 within the housing 77 connects to a binding post 191 on the control board 111 (Fig. 3) and thence to the bridge circuit. A cover 192 on the side of the housing 77 covers the insulators 190, 184 and the respective connections. The potential generated by the cell chain and impressed on the conductors 173 and 185 is measured by means of a potentiometer assembly shown in Fig. 1, in which the potentiometer circuit is designated by a resistance 193 connected by a conductor 194 to a potentiometer resistance 195 having a slider 196, to which the conductor 185 from the reference electrode is electrically connected, a variable resistance 197 connected to the resistance 193 by means of conductors 198 and 199, a resistance 201 connected to the potentiometer resistance 195 by conductors 202 and 203 and to variable resistance 197 by a conductor 188, a resistance 204 connected to the conductor 198 by means of a conductor 205, a variable resistance 206 having a slider 207 connected to the conductor 203 by means of conductor 208, a battery 209, one terminal of which is connected to the resistance 206 by means of a conductor 211, a switch 212, one side of which is connected to the other terminal of the battery 209 by a conductor 213, the opposite side of which is connected to the resistance 204 by a conductor 214, a switch 215 having two positions indicated by the letters Std. meaning Standardized, and the letters Op. meaning Operate, the Std. position connecting a McClure circuit indicated by the numeral 216 either to the conductor 214 by way of conductor 217 or to conductor 218 attached to the slider 219 of variable resistance 197. A standard cell 221 is connected to conductor 198 and has a lead 222 connected to a switch 223 through a contact marked Std. and having the mentioned significance, the switch serving to connect a conductor 224 either to the conductor 222 from the potentiometer assembly or the conductor 173 leading from the glass electrode. The conductor 224 is connected to the amplifier or other voltage detecting device presently to be more fully described, but which functions for the purpose of determining when the potentiometer assembly is brought into electrical balance with the cell chain. The standard cell 221 is connected to oppose the potential of resistance 204, and in balancing the bridge, the two potentials are exactly balanced by moving slider 207 of resistance 206, the point of balance being indicated by the amplifier assembly presently to be described. In parallel with the series connected resistance 193 and potentiometer 195, a further resistance 225 is connected consisting of a temperature sensitive coil connected to conductors 205 and 208 of the potentiometer circuit, the coil 225 being positioned on the temperature tube 18 and being thermally responsive thereto. As the resistance of coil 225 changes with temperature, the potential drop between conductors 205 and 208 will alter, providing the potential drop through resistance 204 is constant. I have found, by way of specific example, that if the combined resistance between the conductors 205 and 208 of the network including the resistance 193, potentiometer 195, variable resistance 197, and resistance 201, is approximately 100 ohms, and further, if the coil 225 is wound from nickel wire of temperature coefficient of 0.005, then if the resistance of coil 225 is 46.8 ohms at 25° C., the potential drop between the conductors 205 and 208 will follow closely the absolute temperature of the temperature tube 18, that is, it will follow the equation $$E = \frac{RT}{nF} \times \mathrm{pH}.$$

Furthermore, if the resistance 206 and the potential of the battery 209 are made large, the effect of change in resistance at the coil 225 on the change in current through the resistance 204 becomes so small that negligible error occurs even when no change in adjustment is made at the variable resistance 206 over wide changes in temperature at the temperature tube. Thus, this potentiometer assembly becomes responsive to the temperature of the sample according to thermo dynamic requirements.

When the potentiometer circuit is balanced or standardized, the switches 215 and 223 are moved to the operate position and the potential of the cell chain is then opposed to the potential between the point of the slider 196 and the point of the slider 219. By moving slider 196 a point can be reached on the potentiometer at which these two potentials exactly balance out as indicated by the amplifier assembly, and the potentiometer 195 being calibrated in terms of pH, the pH of the solution can be read directly therefrom. It will be noted that as the temperature of the sample varies and the potential of the cell chain changes in accordance therewith, the potential between the slider 219 and the slider 196 will alter in the same manner so that the instrument reading will be substantially constant, irrespective of temperature changes in the sample, provided there does not occur a concurrent change in the pH of the sample.

Where the cell chain consists of a saturated calomel half cell coupled with a glass electrode consisting of Corning 015 glass having a contact layer of lead, its potential will be reasonably close to zero at zero pH, under which conditions the slider 196 would be at the extreme end of the potentiometer resistance adjacent to the resistance 193. The value of resistance 197 is then made to be approximately twice that of resistance 193 so that it is possible to apply either a positive or negative asymmetry correction. The purpose of potentiometer 197 and slider 219 is to apply to the potentiometer circuit a fixed increment sufficient to compensate for the asymmetry potential of the glass electrode, while the purpose of resistance 193 is to balance the potential range of the potentiometer 195 to coincide with the potential range of the glass electrode cell chain.

The impulse amplifier shown in Fig. 1 functions to determine the condition when the potential of the potentiometer assembly is equal and opposite to that of the cell chain and for the purpose of standardizing the bridge, depending upon the position of the switches 215 and 223, the procedure so far as the amplifier is concerned being identical. Assuming the switch to be in the Operate position, the glass electrode lead 173 is then connected to the conductor 224 to which connection is made through a resistance 226 to a switch 227 having a contact 228. Contact 228 is accordingly in series with the cell chain by way of conductor 173 through the glass electrode, through the liquid junction and the salt bridge 13 to the reference electrode 14, thence through the temperature correction bridges A and B, thence through conductor 185 to the potentiometer 195, from the potentiometer 195 to the slider 219 of resistance 197 and from slider 219 through switch 215 to the McClure circuit. The opposite contact 229 of the switch 227 is likewise connected to the McClure circuit by conductor 231. The switch 227 has a movable switch blade 232 connecting through a condenser 233 to the grid 234 of a vacuum tube 235. The filament 236 of this tube is also connected to the McClure circuit through a resistance 237, a switch 238 and a conductor 239.

It will be apparent that if the potential between the sliders 219 and 196 is not equivalent to the output of the cell chain as modified by the temperature compensators, there will be a difference in potential between contacts 228 and 229. Switch blade 232, normally engages contact 229 and when moved from this position to engagement with contact 228, if such difference in potential exists, there will be a change in potential on element 241 of the condenser 233, and this will be transferred and expressed as a pulse or change in potential on the grid 234 of vacuum tube 235. On the other hand, when the potential between the sliders 196 and 219 of the potentiometer assembly is equal and opposite to that of the cell chain as modified by its temperature compensators, contacts 228 and 229 will be at the same potential, and under these circumstances switch blade 232 may be moved from engagement from contact 229 to 228 without affecting the potential of the grid 234. The vacuum tube 235 is resistance connected as the first step in a cascade including additional tubes 242 and 243 arranged as will be apparent from the drawings, and in the plate circuit of the third tube 243 of this cascade a meter 244 is connected. It will be seen that as the potential of the grid 234 of the first tube is altered by movement of the switch blade 232, the change will be reflected on the meter 244, and it will further be seen that with any given pH of the sample passing through the glass electrode 17, there will be a position of the potentiometer slider 196 at which the potential generated by the sample and modified by the temperature correction bridges will be exactly balanced, under which circumstances there will be no change in the reading of the meter 244 as the switch blade 232 is moved from contact to contact, and by this means, therefore, the pH of the solution can be read from the potentiometer 195.

In practice, it is frequently desirable to locate the potentiometer and amplifier at some distance from the cell chain proper, and under these circumstances potentials may be generated in conductor 173 by virtue of electronic or electromagnetic fields, and if said potentials are transferred to grid 234 when switch blade 232 is moved to the contact 228, there will occur in meter 244 reactions independent of their relationships to the potential of the cell chain to that of potentiometer, that is, the instrument will become sensitive to stray fields. I have found, however, that the effect of stray field interference can be almost completely nullified by utilization of a high impedance located at 226 and condensers 245 and 246. Such a combination constitutes a filter network, and I have found that when resistance 226 is approximately 10 megohms, and condensers 245 and 246 are approximately 0.002 microfarad, that even extreme interference can be eliminated.

It is to be noted that both condensers 245 and 246 return to a point at McClure potential, and it will be recalled that McClure potential is the same as the potential of conductor 173 at the condition of balance. Consequently, under these circumstances, it is impossible for electrical leakage to occur through condensers 245 and 246. I have also found it advisable to use a third condenser 247, one side being connected between the switch blade 232 and the condenser 233, and the other side connected to the McClure circuit as indicated at 248. I have found that by so doing extraneous contact potentials produced when the switch blade moves between the contacts 229 and 228 are largely eliminated. The condensers 245, 246 and 247 are in this instance 0.002 mf. condensers.

While I have thus described and illustrated specific embodiments of the invention it will be understood that this is by way of illustration and not limitation.

I claim:

1. As an article of manufacture a glass electrode comprising a glass tube for the passage of a test liquid therethrough, spaced conducting layers on the outside of said tube for connection to a measuring instrument, a liquid junction in said tube positioned midway between said layers and guard rings on the outside of said tube spaced from opposite ends of each of said layers.

2. The combination in an electrolytic cell chain of a test electrode assembly comprising a glass electrode tube, a temperature compensation tube, electrically conductive means for supporting one end of each of said tubes, said means being electrically connected together and in contact with a test solution in the respective tubes, means for supporting the opposite ends of said tubes for fluid communication therebetween, said means being electrically insulated from said electrically conductive means except for a test solution, means for passing a test solution through said tubes and said supporting means, and means for connecting an electrical conductor to a portion of the outside surface of said electrode tube sensitive to the concentration of a selected ion in said solution.

3. The combination in an ion activity measurement device of a glass electrode comprising a tube sensitive to the concentration of a selected ion of a test sample therein, a layer of electrically conductive material on the outer surface of said tube, means for connecting a potential measuring device to said layer, and a plurality of bands of electrically conductive material on the outer surface of said tube separated from said layer, spaced from opposite ends thereof to intercept all electrical paths from the first mentioned layer to any point outside the region limited by said bands and means for bringing said bands to the potential of said layer at the instant of measurement.

4. The combination in an ion activity measurement device of a glass electrode comprising a tube sensitive to the concentration of a selected ion of a test sample therein, a bridge tube connecting therewith intermediate the ends of the electrode tube, a layer of electrically conductive material on the outer surface of said electrode tube spaced to one side of the junction between said tubes, and a second layer of electrically conductive material on the opposite side of said junction, said layers being so spaced with respect to said junction that the effect of an electrical current flowing through said sample the potential source of which is external to said electrode produces approximately equivalent and opposite potential drops between said layers and said junction.

5. The combination recited in claim 2 wherein enclosing means are provided for enclosing said tubes to protect said electrode tube from mechanical damage, and to seal said tubes from contamination by dirt and moisture.

6. The combination recited in claim 2 wherein the said means for supporting the electrode tube includes means for making flexible connections to said supporting means.

7. The combination recited in claim 2 wherein the fluid column in said temperature tube is of such shape as to have a materially greater electrical resistanec than the fluid column in said electrode tube.

8. The combination in a glass electrode of a glass tube having inner and outer sides, one of said sides being in contact with a test solution disposed thereagainst, a layer of electrically conductive material on the other side of said tube and responsive to the concentration of a selected ion in said solution for connection to a potential measuring instrument, layers of electrically conductive material on said other side of the tube spaced from opposite ends of said first mentioned layer, and substantially insulated from said layer, and means for connecting the second mentioned layers together and to a shielding circuit to bring said second mentioned layers to the same potential as the first mentioned layer when a measurement is made to prevent the leakage flow of electrons along said tube to and from said first mentioned layer.

9. The combination in an ion activity measurement device of a glass electrode comprising a tube sensitive to the concentration of a selected ion of a test sample disposed therein, a layer of electrically conductive material on the outer surface of said tube in intimate contact therewith, means for connecting a potential measuring device to said layer, a plurality of bands of electrically conductive material on the outer surface of said tube separated from opposite edges of said layer and positioned to intercept electrical leakage from said layer along said tube, and means for bringing said bands to the potential of said layer at the time of measurement.

10. The combination in an electrolytic cell chain for the measurement of ion activity of a glass electrode tube for the passage of a test liquid therethrough, said liquid forming a stray path followed by a stray electrical current, spaced conducting layers on the outer surface of said tube electrically connected together, a reference electrode connected to the liquid in said tube at a point midway between said conducting layers, and a small diameter liquid electrical path in series in the stray path formed by the liquid in said tube to reduce the magnitude of the stray electric current in the liquid in said tube and increase the accuracy of said chain.

11. As an article of manufacture a glass electrode comprising a glass tube arranged for the flow of a test liquid therethrough, a layer of electrically conductive solid material on the outer surface of said tube for connection to a measuring instrument, and bands of electrically conductive solid material on the outer surface of said tube extending around said tube spaced from said first mentioned layer on opposite ends thereof, said bands being disposed to intercept all electrical paths from said first mentioned layer other than the connection of the first mentioned layer to a measuring instrument, said bands being substantially insulated from the first mentioned layer for a connection to a point having the same potential as said first mentioned layer to prevent the flow of electrons along said tube to and from said first mentioned layer.

EDWIN D. COLEMAN.